United States Patent [19]

Voy et al.

[11] Patent Number: 4,661,189

[45] Date of Patent: Apr. 28, 1987

[54] METHOD FOR MANUFACTURING DISCRETE ELEMENTS

[75] Inventors: Peter A. Voy, El Dorado Hills; Robert D. Ihle, Sacramento, both of Calif.

[73] Assignee: Janus Label Corporation, Rancho Cordova, Calif.

[21] Appl. No.: 671,294

[22] Filed: Nov. 14, 1984

[51] Int. Cl.[4] .......... B32B 31/00

[52] U.S. Cl. .......... 156/248; 156/252; 156/267; 156/268; 156/277; 156/291; 428/40; 428/41

[58] Field of Search .......... 156/252, 267, 268, 277, 156/291, 248; 40/2 R; 428/40, 42

[56] References Cited

U.S. PATENT DOCUMENTS

| | | | |
|---|---|---|---|
| 984,443 | 2/1911 | Sanderson | 156/209 |
| 2,304,787 | 12/1942 | Avery | 156/248 |
| 2,391,539 | 12/1945 | Avery | 156/259 |
| 2,467,572 | 4/1949 | Weisselberg | 156/61 |
| 2,783,172 | 2/1957 | Avery | 206/447 |
| 4,008,115 | 2/1977 | Fairbanks et al. | 156/267 |
| 4,022,926 | 5/1977 | Keough et al. | 428/41 |
| 4,253,899 | 3/1981 | Takemoto et al. | 156/277 |
| 4,260,444 | 4/1981 | Fowler | 156/267 |
| 4,281,762 | 8/1981 | Hattemer | 206/390 |
| 4,285,754 | 8/1981 | DiMatteo | 156/250 |
| 4,359,358 | 11/1982 | Hattemer | 156/248 |

OTHER PUBLICATIONS

Advertisement of Meltex Corporation entitled "Hot Melt-Screen Coater C P 200".

Advertisement of Matrix Industries, Inc. entitled "Cora-Drum".

*Primary Examiner*—Jay H. Woo
*Assistant Examiner*—Timothy W. Heitbrink
*Attorney, Agent, or Firm*—Worrel & Worrel

[57] ABSTRACT

A method for manufacturing discrete elements such as labels, borne by a carrier sheet, the method including passing an element sheet from which said elements are to be formed along a first path of travel; passing a carrier sheet along a second path of travel spaced from the first path of travel in a first course and retained in substantial facing engagement with the element sheet in a second course; applying adhesive to one of the sheets prior to the second course in discrete zones individually having positions corresponding to the positions of the planar elements to be formed; and cutting the element sheet in the second course outwardly of the discrete zones of adhesive to form discrete elements adhesively borne by the carrier sheet.

4 Claims, 12 Drawing Figures

METHOD FOR MANUFACTURING DISCRETE ELEMENTS

BACKGROUND OF THE INVENTION

1. Field of the Invention The present invention relates to a method and apparatus for manufacturing discrete elements and the discrete elements and more particularly to such a method and apparatus which are particularly well suited to the manufacturing of substantially planar discrete elements such as labels and still more particularly labels of the pressure sensitive type in a continuous, rapid operation and having application to the manufacture of labels of a wide variety of different types.

2. Description of the Prior Art

There are a variety of industries in which discrete elements must be manufactured at high rates of speed, but where the cost of such manufacture and the limitations inherent in conventional methods and apparatus severely restrict such manufacture. For example, the label manufacturing industry produces labels which are typically sold in rolls consisting of a carrier or release sheet on which are adhesively, but releasably, arranged a multiplicity of labels. Typically the purchasers of such rolls are manufacturers and/or packagers of products. By way of illustration, bottlers of products such as milk, employ machines which accept such rolls of labels and which automatically and successively dispense labels from the rolls and individually apply the labels to the bottles or containers of milk in a predetermined orientation and location. The labels are, of course, printed to order for the bottler so as to contain information relating to the particular products to which they are to be applied.

Label manufacturers must have the capability of manufacturing labels of a multitude of different types so as to be able to meet the needs of their customers. Thus, label manufacturers may be requested to produce labels of virtually any size and shape, of a variety of different materials, with printing which is exposed or buried beneath a lacquer or transparent plastic film as well as to provide labels having multiple surfaces or portions which can be torn off by the end purchaser for use as a coupon or the like. For example, in the bottling industry, where packaging, distribution and display of the bottles causes the bottles to abrade each other, it is desirable to use labels in which the printing is buried beneath and readable through a protective surface so that such printing is not worn off.

A further complication for label manufacturers resides in the fact that adhesives employed to retain the labels on a carrier sheet and thereafter for retaining the label on the product are often slow to set or cure. Such curing is commonly too slow to permit the label manufacturers to produce their own laminated stock, print, die cut, strip the waste matrix from the carrier sheet and wind the carrier sheet bearing the resulting labels into a roll, all in a single continuous process. For purposes of description herein the terms "prelaminated stock" and "laminated stock" are used to mean a carrier or release sheet to which an element sheet has been adhesively attached, but wherein printing, die cutting and other processing of the element sheet has not been carried out. Thus, "prelaminated stock" and "laminated stock" are used herein to mean adhesively interconnected carrier and element sheets disposed in registry with each other to form a lamination, but not otherwise processed to form labels on the carrier sheet. Such prelaminated stock is most commonly wound into a roll for storage, handling and subsequent processing to form labels.

Prior art efforts to form laminated stock, print, die cut and otherwise complete rolls of labels in a single continuous process have resulted in the adhesives migrating, prior to setting of the adhesive, beyond the peripheries of the labels during manufacture and thereafter. In such prior art efforts the problem of adhesive migration has been chronic. Adhesive migration has interfered with die cutting of the labels and stripping of the waste matrix therefrom as well as with winding of the carrier sheet bearing the labels into a roll. Further, once the carrier sheet bearing the labels is wound into a roll, the adhesive may continue to migrate beyond the peripheries of the labels causing surfaces within the roll to stick together and, at very least, interfering with dispensing of the labels from the carrier sheet. Additionally, it has been found impractical to allow the adhesive to set once the prelaminated stock has been formed and prior to such printing, die cutting, stripping and winding steps since this setting or curing process, depending upon the type of adhesive, often takes seven full days to be completed.

Consequently, conventional practice calls for label manufacturers to buy prelaminated stock, or manufacture it themselves and allow it to cure, in meeting their needs and those of their customers. The preliminated stock is thereafter printed and die cut to form the labels in accordance with the needs of those customers. This requires label manufacturers to maintain large inventories of prelaminated stock of a wide variety of types so as to be able to fill, on relatively short notice, their customer's orders. Not only are such inventories expensive to maintain and store, but the prelaminated stock is itself expensive to purchase.

Still further, because of the foregoing conventional practices, it is, as a practical matter, impossible to manufacture labels of certain types since printing must conventionally be performed by the label manufacturer and prelamination of the stock is performed by another company prior to receipt by the label manufacturer. For example, it is as a practical matter not possible to produce labels in which the printing is captured on the reverse side of a transparent element sheet and thus between that element sheet and its carrier sheet. This is the case because, of course, the printing must be applied to the underside of the transparent element sheet in order to be visible through the element sheet and yet it is the manufacturer of the prelaminated stock, not the label manufacturer, which must adhesively apply the element sheet to the carrier sheet. Referring again to the example of bottling companies, this makes the production of buried print labels, wherein the printing is buried beneath and readable through a transparent film in order to protect the printing from scuffing by other bottles, impractical or inordinantly expensive to produce.

Therefore, it has long been known that it would be desirable to have a method and apparatus for manufacturing discrete elements and the discrete elements, such as labels borne by a carrier sheet, wherein all steps involved in producing such elements can be performed at one place of operation and in a single continuous process permitting label manufacturers to produce labels of virtually any type rapidly, inexpensively and without requiring the purchase and maintaining of an inventory of prelaminated stock.

SUMMARY OF THE INVENTION

Therefore, it is an object of the present invention to provide an improved method and apparatus for manufacturing discrete elements and the discrete elements such as labels.

Another object is to provide such a method which obviates the need for label manufacturers to purchase and maintain inventories of prelaminated stock or to manufacture their own prelaminated stock for later use in order to possess the capability of rapidly filling their customer's orders.

Another object is to provide such a method which permits labels or the like of a wide variety of shapes, sizes, forms of construction and utility to be manufactured while achieving all of the other advantages possessed by the method of the present invention.

Another object is to provide such a method which permits the steps or printing, laminating, die cutting, stripping of the waste matrix and winding of labels borne by a carrier sheet into a roll to be performed in a single continuous operation.

Another object is to provide such a method which allows label manufacturers to reduce substantially the cost of manufacturing labels while at the same time increasing the number of types of labels which can be manufactured.

Another object is to provide such a method which precludes the multitude of problems encountered in conventional methods by adhesive migration, or, more particularly, the movement of adhesives which retain labels and the like on a carrier sheet beyond predetermined boundaries prior to curing of the adhesives, the method of the present invention thereby avoiding such problems encountered in conventional methods as unwanted adhesion between the fibers of the carrier sheet beyond its silicone coating and the labels, between the die cutting assemblies and the migrated adhesive, between the carrier sheet and the waste matrix between surfaces of the carrier sheet and labels during rewinding, between surfaces of the carrier sheet and labels within the roll after rewinding and between the carrier sheet and labels during dispensing of the labels from the carrier sheet.

Another object is to provide such a method which permits the rapid and inexpensive manufacture of labels in which the print constituting the written subject matter of the label is buried beneath a transparent film through which the print can be read.

Another object is to provide such an apparatus which can be operated to perform the method of the present invention, which facilitates the practice of the method hereof and which is adaptable to the performance of a wide variety of label manufacturing operations.

Another object is to provide a discrete element, such as a label, adapted for rapid and inexpensive manufacture, capable of being dispensed without the problems associated with conventional elements and adapted to construction in a wide variety of different configurations.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENTS

Apparatus

Figure 1:
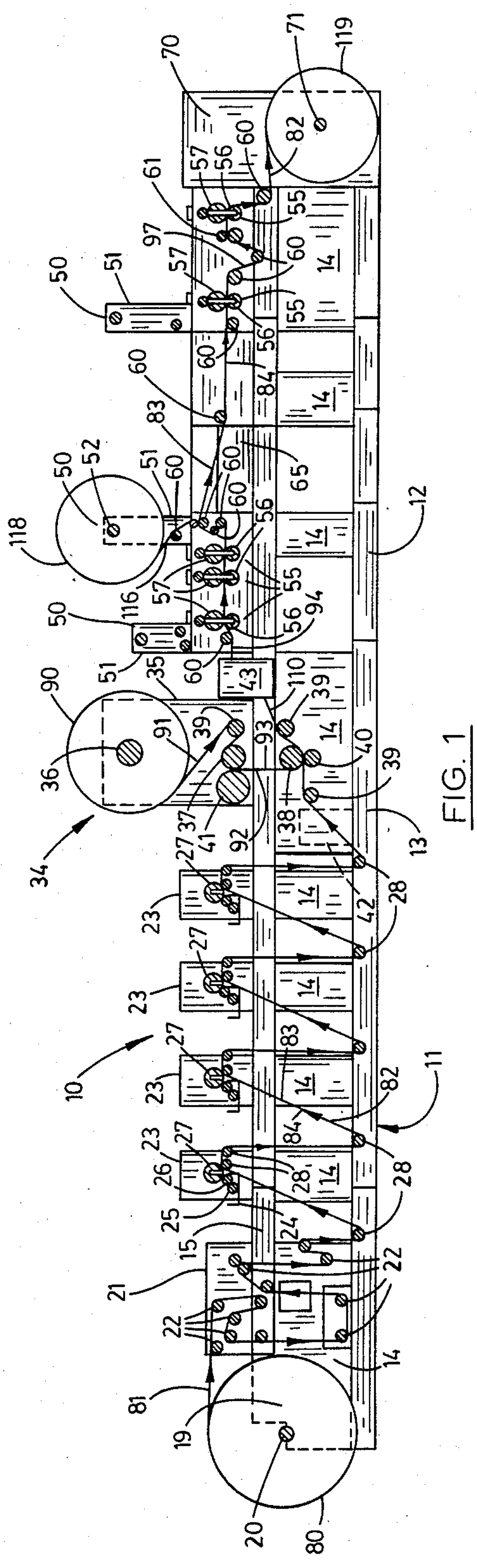
FIG. 1 is a side elevation of the apparatus of the present invention employed in the practice of the method of the present invention.

Referring more particularly to the drawings, the preferred embodiment of the apparatus of the present invention, operable to practice of the method of the present invention, r is generally indicated by the numeral 10 in FIG. 1. It will be understood that the embodiment shown and described herein is one of a great many embodiments of the apparatus which can be employed depending upon the specific type of elements such as a label or other element, to be manufactured. This will become more clearly apparent upon reference to this description of the preferred embodiments. For illustrative convenience, the method, apparatus and discrete elements shown and described herein relate to the manufacture of labels, but it will be apparent that they can be employed to manufacture other types of discrete elements.

The apparatus 10 includes a narrow web printing press 11 having a main frame 12. The main frame has lower horizontal frame members 13 adapted to be mounted on a supporting surface, not shown. The main frame has vertical supports 14 on which are mounted upper horizontal frame members 15 substantially parallel to the lower horizontal frame members 13.

The printing press 11 has a roll mounting assembly or station 19 having a roll mounting reel 20 adapted to mount for rotational movement a roll of material hereinafter to be described from which such material can be dispensed. The printing press has a tension control assembly or station 21 mounting a plurality of tension station rollers 22. The printing press, as shown in FIG. 1, has four printing assemblies or stations 23 mounted on the printing press in side-by-side relation. It will be understood that any desired number of printing stations can be employed depending purely upon the requirements of the operator in manufacturing the particular elements or labels desired. Each of the printing stations has an ink source 24 in which is mounted an ink pick-up roller 25. An ink transfer roller 26 is mounted on each printing station in receiving relation to ink from the pick-up roller and disposed in feeding relation to a plate roller 27. Each of the printing stations has sheet or backup rollers 28. The pick-up roller 25 receives ink from the ink source 24, and that the ink is transferred through the transfer roller 26 to the plate roller 27 which actually contains the plate which applies the ink to the work product. Each printing station thus applies a different type or color of ink, a different form of print, or otherwise individually processes the work product passing therethrough to create the effect desired in the finished product. It will be understood that other types of printing assemblies or stations can alternatively be employed for printing including rotogravure, letterpress, silk screen and offset type assemblies.

The apparatus 10 of the present invention has an adhesive application assembly or station 34 not part of any conventional printing press. The adhesive application assembly or station includes vertical supports 35 affixed on the upper horizontal frame members 15 and adapted to mount the various components of the adhesive application station. A roll mounting reel 36 is borne by the vertical supports and is adapted rotationally to mount a roll of material hereinafter to be identified. An upper impression roller 37 is rotationally mounted on the vertical supports and a lower impression roller 38 is rotationally mounted on the vertical supports 14 of the printing press. The impression rollers are preferably adapted for the selective heating or cooling thereof. Similarly, sheet rollers 39 and a lower nip roller 40 are rotationally mounted on the vertical support 14 within the adhesive application station disposed in the relationship shown in FIG. 1 and diagrammatically in FIGS. 2 and 6.

Figures 2, 3, 4, 5:
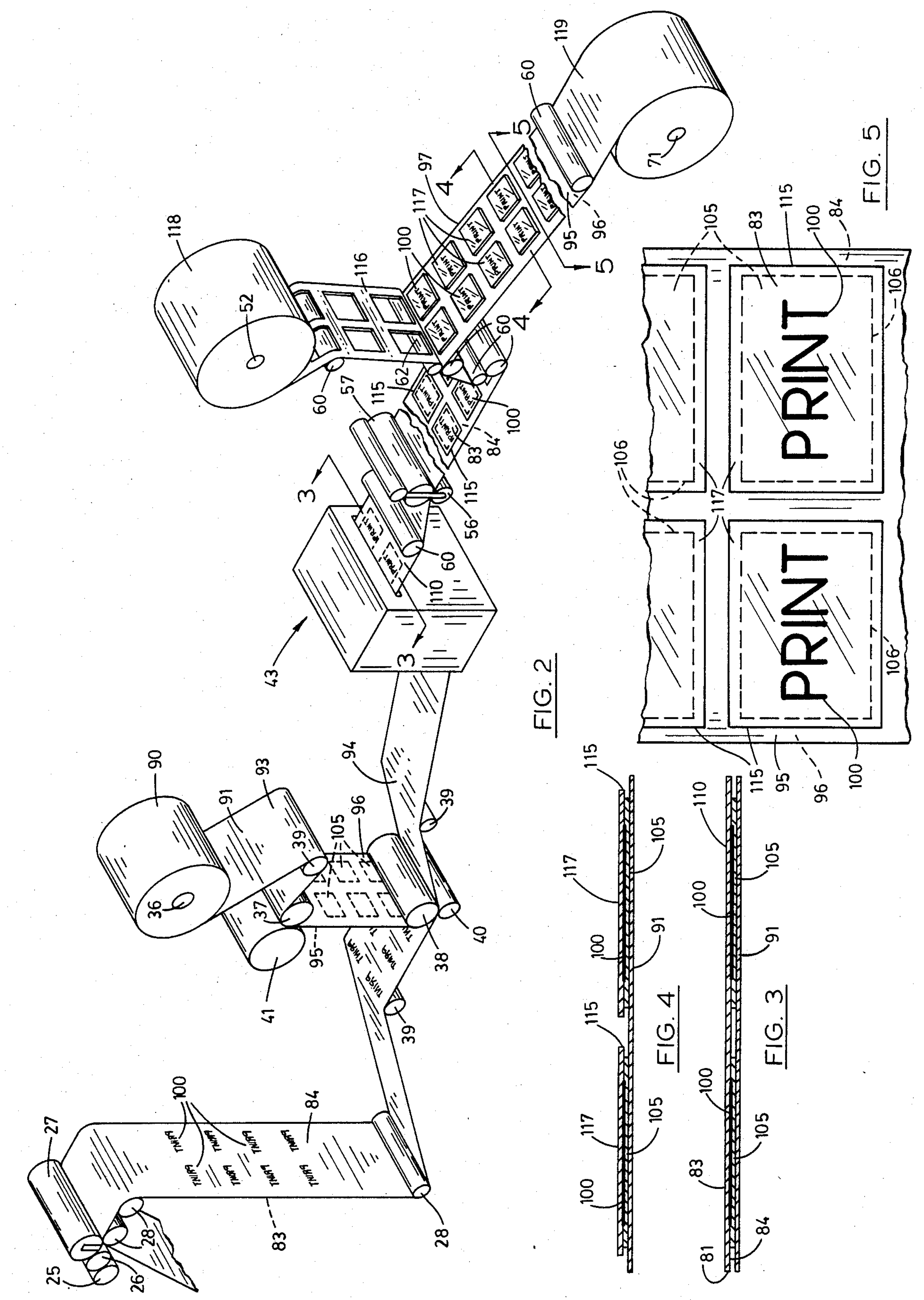
FIG. 2 is a somewhat enlarged, fragmentary diagrammatic perspective view illustrating a first embodiment of the method of the present invention in the manufacture of labels in which the print comprising the label is buried beneath a transparent film.
FIG. 3 is a somewhat further enlarged, transverse section taken on line 3—3 in FIG. 2.
FIG. 4 is a somewhat enlarged, transverse section taken on line 4—4 in FIG. 2.
FIG. 5 is a somewhat enlarged, fragmentary plan view taken from a position indicated by line 5—5 in FIG. 2.
Figures 6, 7, 8:
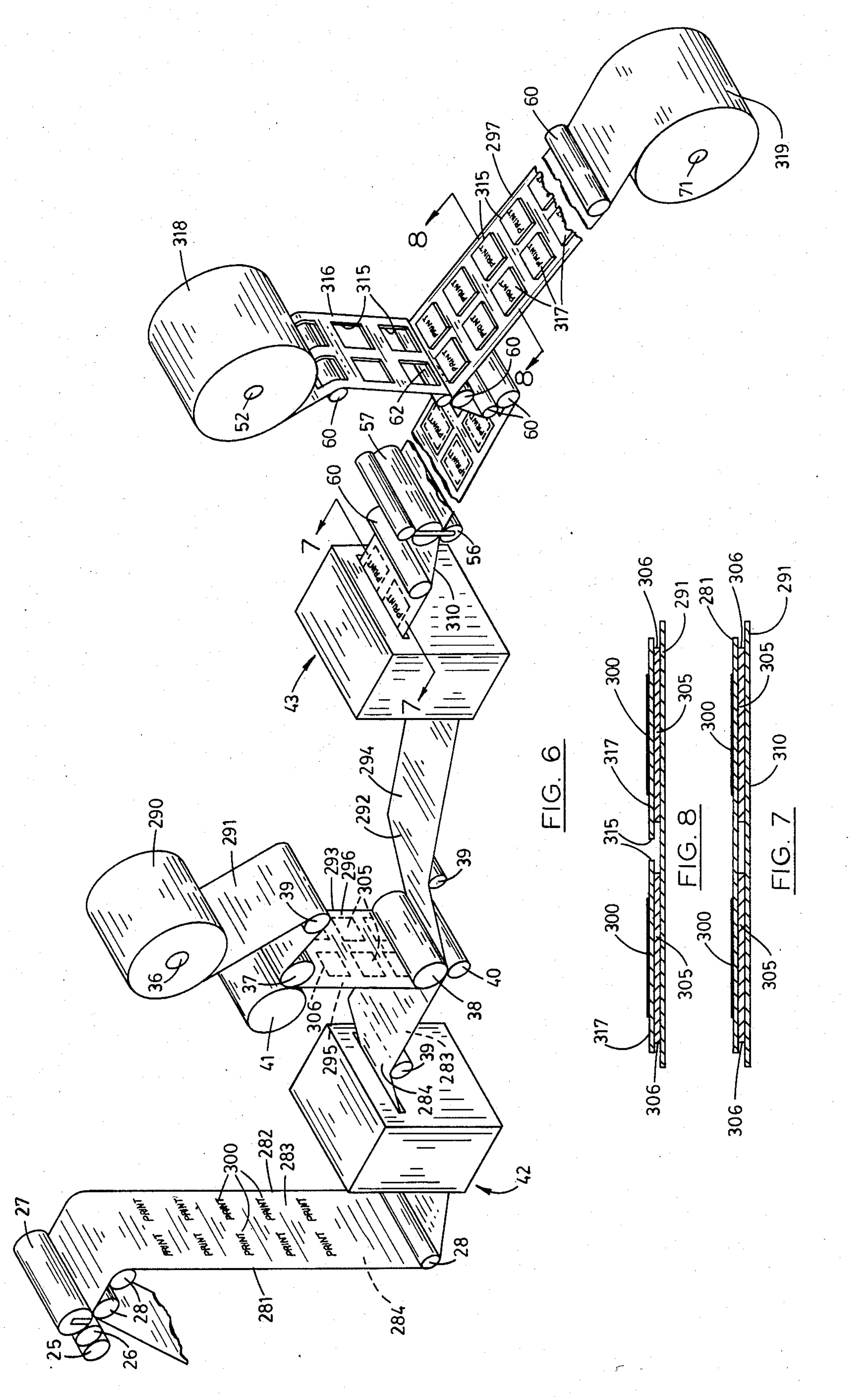
FIG. 6 is a somewhat enlarged, fragmentary, diagrammatic perspective view illustrating a second embodiment of the method of the present invention employed in the manufacture of labels in which the print comprising the written subject matter of the label is applied to the outer surface of the resulting label.
FIG. 7 is a somewhat further enlarged, transverse section taken on line 7—7 in FIG. 6.
FIG. 8 is a somewhat enlarged, transverse section taken on line 8—8 in FIG. 6.

An adhesive applicator or adhesive printing head 41 is rotationally mounted on the vertical supports 35 of the adhesive application station 34 in the positions shown in FIGS. 1, 2 and 6 and an substantially parallel juxtaposition to the upper impression roller 37. The printing head can be any one of several different types capable of applying discrete zones of adhesive in predetermined patterns in continuous operation. In the preferred embodiment the printing head is a rotary screen printing head which is operable to apply adhesive from a substantially cylindrical applicator through a screen pattern which defines the zone or zones. The screen is removable in the apparatus 10 of the present invention and a screen for defining virtually any zone or zones of adhesive can be installed. Thus, the shape, size, number and arrangement of zones can be selected by the operator. Similarly, the weight or thickness of adhesive and the specific type of adhesive can be selected by the operator. One rotary screen printing head capable of being modified for use in the apparatus of the present invention is that originally manufactured by Matrix Industries, Inc. and sold under the trademark "Cora-Drum" and now sold by LTI Corporation, a subsidiary of GRACO INC., under the trademark "Microprint". Another such rotary screen printing head capable of such adaption is sold by Meltex Corporation. Among the other types of printing heads which can be adapted for such use and as a result are capable of operation to apply discrete zones of adhesive are the flexographic press, the rotogravure press, the print wheel press, the offset press and the letterpress printing heads.

A first turnbar assembly 42 is shown in phantom lines in FIG. 1 mounted on the lower horizontal frame members 13 of the printing press 11. The apparatus 10 as shown in full lines in FIG. 1 is adapted to perform a specific label manufacturing process hereinafter to be described which does not require use of this first turnbar assembly. However, the first turnbar assembly is used in the process shown in FIG. 6 and hereinafter to be described. Accordingly, in FIG. 1 the first turnbar assembly is shown in phantom lines simply to indicate where that unit would be positioned for the process of FIG. 6. A second turnbar assembly 43 is mounted on the upper horizontal frame members 15 in the position shown in FIG. 1. The turnbar assemblies are of conventional design and may be of any one of a number of different types. The turnbar assemblies operate to invert a sheet passing therethrough, or, in other words, a sheet passing through either of the turnbar assemblies is rotated about its longitudinal axis 180°.

Three upstanding roll take-up assemblies or stations 50 are mounted on the printing press 11 and each station has a vertical support 51. A take-up reel 52 is mounted for rotational movement on the vertical supports 51 of each roll take-up assembly or station. The three roll take-up assemblies or stations are not normally all used at the same time, but rather are provided to permit the apparatus to be readily adapted to the manufacture of different types of labels or the like.

Five die cutting assemblies or stations 55 are mounted on the upper horizontal frame members 15 of the printing press 11. Each of the die cutting assemblies or stations has a lower impression roller 56 and an upper die cutting roller 57. It will be understood that the die cutting stations can be positioned on the printing press 11 and operated in the die cutting of labels as required for the particular type of label to be manufactured. In any case, die cutting is performed by the die cutting roller against the resistance of the impression roller of each die cutting assembly or station.

A plurality of sheet rollers 60 are mounted for rotational movement on the printing press 11 in positions to direct a continuous sheet passing therethrough along the desired course. A tension or nip roller assembly 61 is mounted on the printing press and operates to maintain the desired tension on a sheet passing therethrough. A waste matrix stripping bar 62 is mounted on the printing press in substantially parallel juxtaposition to the upper sheet roller 60 beneath the central roll take-up assembly or station 50.

A control module 65 containing the controls for operation of the apparatus 10 is mounted on the upper horizontal frame members 15.

A take-up or rewind assembly or station 70 is mounted on the printing press 11 on the end thereof opposite the unwind or roll mounting assembly or station 20. The rewind assembly or station 70 mounts for rotational movement a take-up reel 71.

Method

First Embodiment

Using the apparatus 10 of the present invention heretofore described, the method of the present invention can be employed to manufacture discrete elements such as labels of a multiplicity of different types. For this purpose, it will be understood that the apparatus 10 may need to be rearranged in various respects in order to accommodate manufacture of a particular type of label. With the apparatus 10 arranged in the configuration shown in FIG. 1 and heretofore described, the apparatus can be employed, using the method of the present invention, to produce labels of the type shown in FIGS. 4 and 5. The method for producing labels of this type using the apparatus of FIG. 1 is illustrated diagrammatically in FIG. 2. For this purpose, a roll of transparent film 80 is mounted rotationally on the reel 20 of the roll mounting assembly or station 19. The transparent film of the roll constitutes a face or element sheet 81 which can be fed from the roll. The element sheet is extended through the apparatus 11, as shown in FIGS. 1 and 2, along a first path of travel 82 extending from the roll mounting assembly or station 20 to the roll take-up station 50. Thus, the element sheet is unwound from the roll 80 and is wound about the tension station rollers 22 of the tension control station 21, as shown in FIG. 1, about the sheet rollers 28 and beneath the plate roller 27 of each printing station 23; over the sheet rollers 39 and between the lower impression roller 38 and nip roller 40; through the second turnbar assembly 43 wherein the sheet is inverted; through the first three die cutting stations 55 and, with respect thereto, between the impression roller 56 and die cutting roller 57 thereof; about the sheet rollers 60 to the left of and beneath the roll take-up station 50; about the waste matrix stripping bar 62; and on to the take-up reel 52 of the take-up station 50. This path constitutes a first path of travel 82. As can best be visualized upon reference to FIG. 2, and as will hereinafter be described, prior to entering the second turnbar assembly 43, the surface of the element sheet 81 disposed in an upwardly facing direction is actually the surface thereof which is thereafter placed in direct contact with the adhesive. Consequently, the surface of the element sheet to the right of the second turnbar assembly 43 facing in an upward direction is the face of the sheet which forms the face or front of the resulting label. In this context, the element sheet has a front surface 83 and a back surface 84 which correspond respectively to the front and back surfaces of the resulting labels.

A roll of a release or carrier sheet 90 is mounted on the roll mounting reel 36 of the adhesive application assembly or station 34. The roll can be unwound to dispense a continuous carrier sheet 91 which typically has at least one surface coated with an adhesive resistant substance such as a silicone type coating. The carrier sheet is unwound from the roll 90 and extended through the apparatus 10 from the roll 90 along a second path of travel 92 to the take-up reel 71 of the take-up or rewind station 70, as shown in FIGS. 1 and 2. The carrier sheet, so installed, extends in a first course 93 of the second path of travel 92 about the sheet roller 39, over the upper impression roller 37 and between the upper impression roller 37 and the adhesive printing head 41 to the lower impression roller 38. The carrier sheet is extended in the second path of travel along a second course 94 substantially coinciding where disposed in facing engagement with the element sheet 81 in the first path of travel between the lower impression roller 38 and the nip roller 40, over the sheet roller 39, through the second turnbar assembly 43 wherein the element and carrier sheets are together inverted, beneath the sheet roller 60 through the first three die cutting stations 55, about sheet roller 60 over waste matrix stripping bar 62. As can best be visualized in FIG. 2, adhesive is applied to the surface of the carrier sheet which faces the adhesive printing head and it is this surface on which the resulting labels are formed. This surface of the carrier sheet thus constitutes a front surface 95 of the carrier sheet and the opposite surface thus constitutes a back surface 96 of the carrier sheet. The second path of travel has a third course 97 extending from the stripping bar 62 to the take-up or rewind station 70.

After installation of the element sheet 81 and carrier sheet 91 as described, the apparatus 10 is adjusted and charged with those materials required for its operation. This includes, adjustment of the tension on the element sheet 81 and carrier sheet 91, insuring that the printing stations are charged with ink and adjusted for proper operation, confirming that the adhesive printing head 41 is charged with adhesive and properly adjusted, checking the adjustment of the die cutting stations 55, checking the operability of the take-up reels 52 and 71 and the like.

Thereafter, the apparatus 10 is operated using the control module 65 and the other controls, not shown, of the various stations. As a consequence, the back surface 84 of the element sheet 81 is passed through the printing stations 23 in succession until after passage from the last printing station 23 in sequence, all of the print which will comprise the printed text of each of the completed labels is applied to the back surface 84 of the element sheet in positions corresponding to the labels to be formed. For illustrative convenience, such print is identified by the numeral 100 in FIGS. 2, 3, 4, and 5 and is illustrated as being of the size relative to the element sheet shown in those views. Further, as can be visualized on the left in FIG. 2, the print is applied to the back surface in such a way as to be readable through the front surface 83 of the element sheet by virtue of the fact that the element sheet is transparent film. In FIGS. 3 and 4, the print 100 is visible as a heavy dark line.

Simultaneously, the apparatus 10 draws the carrier sheet 91 from the roll 90 along the second path of travel. As the carrier sheet passes along the first course 93 of the second path of travel, it passes into engagement with the adhesive printing head 41 which applies a predetermined zone or zones of adhesive on the front surface 95 of the carrier sheet for each label to be manufactured. Since the screen of the printing head can be selected to apply virtually any zone or zones of adhesive, the particular pattern most appropriate for the particular type of label to be manufactured can be preselected by the operator. In the embodiment shown in FIG. 2 the adhesive is applied in a zone of adhesive 105 of a rectangular configuration individual to each label to be manufactured. The zone of adhesive thus has a rectangular periphery 106 which can, perhaps, best be visualized in FIG. 5.

It will also be seen that application of the print 100 to the element sheet 81 and of the zone of adhesive 105 to the carrier sheet is so adjusted that upon passage of the carrier sheet and the element sheet between the lower impression roller 38 and nip roller 40, the element and carrier sheets are adhesively married such that the print and zone of adhesive for each label are disposed in facing engagement and oriented relative to each other as shown best in FIG. 5. Since, as previously noted, the front surface 95 of the carrier sheet 91 is coated with an adhesive resistant coating, such as a silicone substance, placing of the carrier sheet and element sheet in facing relation effectively causes each zone of adhesive 105 to adhere to the back surface 84 of the element sheet effectively capturing the print of each individual label between the back surface 84 of the element sheet and the adhesive. Thus, as will subsequently be seen, when the individual manufactured labels are pulled from the carrier sheet, the zone of adhesive 105 for each label is released from the front surface 95 of the carrier sheet and is retained on the label so formed.

If desired, however, the apparatus 10 and the method can be modified so that the zone of adhesive for each label is applied directly to the back surface 84 of the element sheet 81 by the adhesive printing head 41 after the application of the print 100 to the back surface 84.

When the element and carrier sheets 81 and 91 respectively are adhesively married as described, they form a web 110 which is passed through the second turnbar assembly 43 causing the web to be inverted or, in other words, rotated about its longitudinal axis 180°. This disposes the front surface 83 of the element sheet in upwardly facing relation so that the print 100 for each label can be examined by the operator looking downwardly thereon.

Thereafter, the web 110 is passed through the die cutting stations 55 which severs the element sheet 81, in the embodiment shown in FIGS. 1, 2, 3, 4 and 5 along a rectangular course 115 individual to each label, and outwardly spaced from the periphery 106 of the zone of adhesive 105 for each label. Thus, the periphery 106 of the zone of adhesive for each label to be manufactured is inwardly spaced or recessed from the outer periphery of the resulting labels, as can best be seen in Fig. 5. Therefore, there is a space of a width which can be preselected by the operator extending entirely about each zone of adhesive 105 and to the periphery 115 of each resulting label in which there is no adhesive. As a result of the absence of adhesive within this space, the die cutting assembly does not become jammed or fouled by contact with adhesive.

Upon completion of the die cutting operation by passage through the die cutting stations 55, the web 110 is passed about the sheet rollers 60 and beneath the waste matrix stripping bar 62. The element sheet 81, as previously noted, passes along the remainder of the first path of travel from the stripping bar and is wound on to the take-up reel 52. The zones of adhesive 105 retain the resulting labels on the carrier sheet. Thus, the portion of the element sheet 81 outside of the courses of severing 115 are stripped from the carrier sheet 91 in the form of a waste matrix 116 leaving the resulting labels 117 adhesively attached to the carrier sheet, as shown on the right in FIG. 2. The waste matrix is wound onto the take-up reel 52 as the process is continued to form a waste matrix roll 118.

Conversely, the carrier sheet 91 bearing the labels 117 is passed along the third course 97 of the second path of travel and is wound onto the take-up reel 71 to form a completed label roll 119. The label rolls thereafter can be rewound for inspection, to remove any damaged labels and to form new individual label rolls of predetermined label count. Alternatively, the carrier sheet bearing the labels can be cut into sheets to form stacks of such sheets.

The label rolls 119 or the rewound label rolls, so manufactured, are then delivered to the purchaser who employs conventional equipment to dispense the labels 117 from the carrier sheet 91 of the roll for application to the particular product or container for which the labels were ordered.

The method of the present invention and the apparatus 10 therefor can be varied in a multiplicity of ways for the purpose of the manufacture of labels of a particular type and in accordance with the orders placed therefor. However, the labels 117 are particularly desirable in a number of important respects. The periphery 106 of the zone of adhesive 105 of each label is recessed from the outer periphery of the labels. This facilitates dispensing of the labels from the carrier sheet in that it leaves an edge free from adhesive attachment to a carrier sheet which facilitates removal of each label and precise positioning in registry with the product. Furthermore, recessing of the zone of adhesive from the periphery 115 of each label leaves room for what migration of the adhesive may occur between the time of application of the adhesive to the carrier sheet and the time the adhesive cures. Thus, any migration which occurs does not migrate beyond or even to the periphery 115 of the label and therefore will not jam or clog any portions of the apparatus 10, nor interfere with stripping of the waste matrix, nor adhere to other surfaces within the label roll nor jam or otherwise interfere with dispensing of the labels from the carrier sheet during the process of attachment of the labels to the end product. Still further, the labels 117 retain the print 100 thereof in a "buried" relationship beneath the transparent film 80 of the label and between the transparent film of the label and the zone of adhesive 105. Consequently, the zone of adhesive protects the print from the underside and the transparent film of the label itself protects the print from the outer side and to such a degree that any scuffing of products bearing the labels does not in any way damage the print.

Second Embodiment

A second embodiment of the method of the present invention is illustrated in FIGS. 6, 7 and 8. This method varies from that heretofore described primarily only in that and to the extent that it results in the manufacture of a label wherein the print is applied to the outer surface thereof. The method is primarily adapted for the production of labels wherein the label material itself is not transparent.

For practice of this method using the apparatus 10, the first turnbar assembly 42 is installed on the lower horizontal frame members 13 at the position shown in phantom lines in FIG. 1. The second turnbar assembly 43 is retained in the position shown in full lines in FIG. 1.

Thereafter, a roll 280, not shown in the drawings but corresponding to roll 80 in FIG. 1, of an element sheet 281 for use in manufacturing the labels to be formed with the second embodiment of the method of the present invention is installed on the roll mounting reel 20 and threaded through the first path of travel 282. The first path of travel 282 is identical to the first path of travel 82 described in respect to the first embodiment of the method of the present invention with the exception that the element sheet is extended through the first turnbar assembly 42 and the second turnbar assembly 43. Upon being threaded along the first path of travel 282, the free end of the element sheet is attached to the take-up reel 52 of the take-up station 50. For purposes of illustrative convenience, it will be understood that the element sheet has a front surface 283 and a back surface 284 with reference to its orientation with respect to the resulting labels. It will be seen that this relationship of the front and back surfaces of the element sheet 281 for the portion of the first path of travel on the far left in FIG. 6 is exactly the opposite of the relationship for the corresponding surfaces of the element sheet 81 shown on the far left in FIG. 2.

A roll 290 of a release or carrier sheet 291 is installed for rotational movement on the roll mounting reel 36 of the apparatus 10 and threaded along the second path of travel 292 including a first course 293 precisely corresponding to the first course 93 of the first embodiment of the method hereof and along second and third courses 294 and 297 respectively exactly corresponding to the second and third courses 94 and 97 of the first embodiment. The free end of the carrier sheet 290 is threaded along the second path of travel and attached at its remote end to the take-up reel 71 of the rewind station 70 of the apparatus. As can best be seen upon examination of the first course 293, the carrier sheet has a front surface 295 and a back surface 296 precisely corresponding to the surfaces 95 and 96 of the carrier sheet 91 of the first embodiment of the method of the present invention.

Thereafter, the apparatus 10 is operated using the control module 65 and the various other controls, not shown, so that the printing stations 23 apply print 300 on the front surface 283 of the element sheet 281 in areas corresponding to the labels to be formed. Since the print is applied to the front surface of what will be the same in the resulting labels, the print is readable from the surface directly visible on the far left in FIG. 6 as contrasted with the surface directly visible on the far left in FIG. 2.

As previously described with respect to the embodiment of the method shown in FIG. 2, the adhesive printing head 41 applies a zone of adhesive 305 to the front surface 295 of the carrier sheet 291 in positions corresponding to those of the labels to be formed. Each of the zones of adhesive has a rectangular periphery 306.

The element sheet 281, passing through the first turnbar assembly 242 is inverted so the upon reaching the lower impression roller 38 and nip roller 40, the element sheet is inverted. Accordingly, on passage of the element sheet and carrier sheet between the lower impression roller 38 and nip roller 40, the zones of adhesive 305 of the labels to be formed are placed in facing engagement with the back surface 284 of the element sheet and in alignment with the print 300 of their respective labels to be formed. Thus, the element sheet 281 and carrier sheet 291 are placed in adhesive engagement to form a web 310 extending from the lower impression roller 38 and nip roller 40 to the waste matrix stripping bar 62. The web is passed through the die cutting stations 55 which sever the element sheet 281 along courses of severing 315. As with the embodiment of the method of the present invention shown in Fig. 2, when the web passes about the waste matrix stripping bar 62, the waste matrix 316 is pulled from the carrier sheet leaving the labels 317 thereon, as shown in FIG. 6. The waste matrix is wound onto the take-up reel 52 to form a waste matrix roll 318. Simultaneously, the carrier sheet 291, bearing the labels 317 is wound onto the take-up reel 71 forming a label roll 319.

The labels 317 so formed consist of a nontransparent sheet bearing the print 300 and having a zone of adhesive 305 on the opposite side thereof recessed from the periphery 315 of each label and borne by the carrier sheet 291, as can best be seen in FIG. 8.

As previously noted, the method of the present invention can be employed to manufacture labels of a virtually infinite number of types. For example, the embodiment of the method shown diagrammatically in FIG. 2 can be employed in such a manner as to cause the print 100 to be applied to the front surface 83 of the element sheet rather than the back surface 84, as heretofore described. Similarly, the process can be varied so that printing is performed after formation of the web so that, as viewed in FIG. 1, one or more of the printing stations 23 would be to the right of the lower impression roller 38 and nip roller 40. Further, the process can be varied in such a manner as to provide more than one lamination of sheets in various combinations including such variations wherein the end user of the product can remove an outer lamination from the label for use as a coupon. Still further, the die cutting stations 55 can be employed in a process so as to perforate a portion of the label permitting the end user to tear off a portion of the label for use as a coupon or the like. All of these variations are made possible by the process of the present invention for the first time permitting a label manufacturer to produce virtually any type of label in accordance with his customers order without dependence upon ordering or himself manufacturing and curing prelaminated stock.

Discrete Elements

Illustrative of some of the different types of discrete elements such as labels and the like, in addition to those already shown and described, which can be manufactured using the method and apparatus of the present invention are the labels shown in FIGS. 9, 10, 11 and 12. It will be understood that these are representative of only some of the types of labels, in particular those having different shapes and sizes and with different shapes and sizes of zones of adhesive, but in which the zones are recessed from the peripheries of the labels. If desired, however, the adhesive can be applied in zones with peripheries precisely corresponding to the peripheries of the labels.

Figure 9:
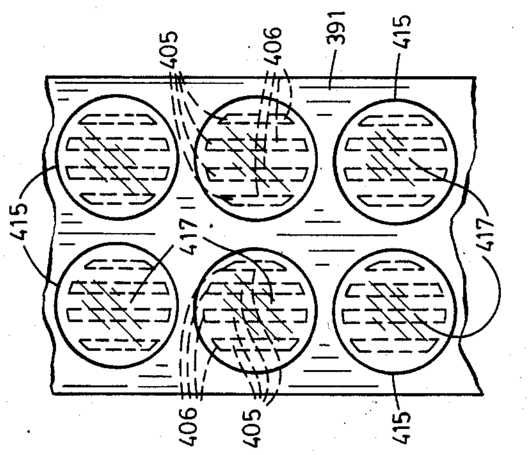
FIG. 9 is a somewhat enlarged, fragmentary top plan view of a carrier sheet bearing labels illustrating a first alternate pattern of adhesive application is shown in hidden lines.

With respect to FIG. 9, a carrier sheet 391 is shown fragmentarily wherein zones of adhesive 405 have been applied to the carrier sheet. The zones of adhesive 405 for each of the labels to be manufactured are long narrow strips having peripheries 406 covering an area recessed from the peripheries 415 of the resulting labels 417.

Figure 10:
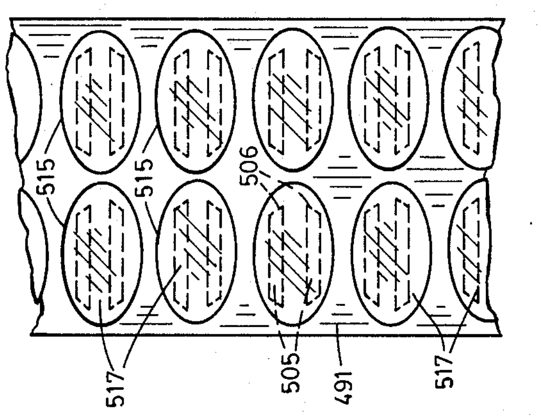
FIG. 10 is a somewhat enlarged, fragmentary top plan view of a carrier sheet bearing labels wherein the adhesive is applied in a second alternate pattern of adhesive application is shown in hidden lines.

In FIG. 10, a carrier sheet shown fragmentarily at 491 has zones of adhesive 505 applied thereto for each of the labels to be formed. Two zones of adhesive are applied to the carrier sheet for each label and the zones have peripheries 506 which are of narrow configuration and which extend transversely of the carrier sheet and are confined to an area smaller than the peripheries 515 of the labels 517 and recessed therefrom. As can be seen, the peripheries 515 of the labels are of oval configurations.

Figure 11:
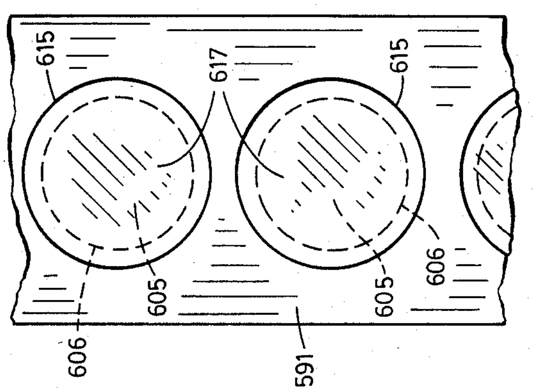
FIG. 11 is a somewhat enlarged, fragmentary top plan view of a carrier sheet bearing labels wherein the adhesive is applied in a third alternate pattern of adhesive application is shown in hidden lines.

A carrier sheet 591 shown fragmentarily in FIG. 11 has zones of adhesive 605 applied thereto. The peripheries 606 of the zones of adhesive are circular and one is provided for each label to be formed. The peripheries 606 are recessed from their respective peripheries 615 of the resulting labels 617.

Figure 12:
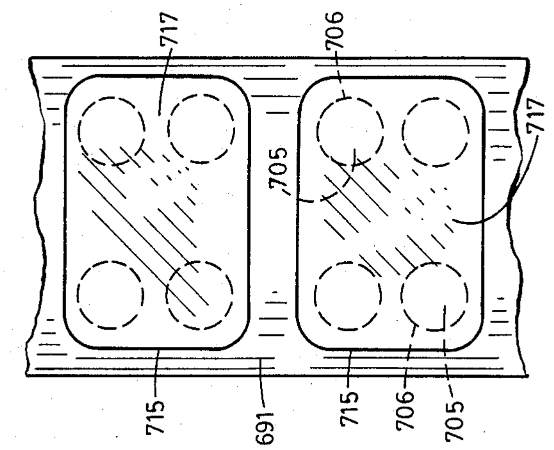
FIG. 12 is a somewhat enlarged, fragmentary top plan view showing a carrier sheet bearing labels wherein a fourth alternate pattern of adhesive application is shown in hidden lines.

In FIG. 12, a carrier sheet 691 is shown fragmentarily to which are applied zones of adhesive 705. For zones of adhesive 705 are applied to the carrier sheet for each label to be formed. The zones of adhesive have peripheries 706 of circular configurations and the zones are spaced from each other but taken together cover an area smaller than the peripheries 716 of the labels 717 formed thereby so that the zones of adhesive are in all cases recessed from the peripheries of the labels.

Therefore, the method and apparatus for manufacturing discrete elements and the discrete elements of the present invention permit the operator to manufacture at one place of operation and at one time virtually all types of labels and the like rapidly, inexpensively and without requiring the maintaining of an inventory of prelaminated stock and without the multitude of problems associated with conventional methods and apparatus, thereby substantially reducing the overall expense of the operation while vastly improving the number and quantity of types of labels and the like which can be manufactured.

Although the invention has been herein shown and described in what are conceived to be the most practical and preferred embodiments, it is recognized that departures may be made therefrom within the scope of the invention, which is not to be limited to the illustrative details disclosed.

Having described invention, what we claim as new and desire to secure by Letters Patent is:

1. A method for manufacturing discrete elements, said discrete elements carried by a carrier sheet and wherein the discrete elements manufactured by the method are arranged in substantial alignment on the carrier sheet, each discrete element to be manufactured having a predetermined periphery along which severing is to be performed, said discrete elements subsequently to be dispensed from the carrier sheet during movement of the carrier sheet in a predetermined direction of movement and the discrete elements each having leading and trailing edges relative to said direction of movvement of the carrier sheet, the method comprising:

A. passing the carrier sheet and a face sheet from which said discrete elements are to be manufactured along first and second paths of travel which are initially spaced from each other and thereafter are traveled with each other with corresponding mating surfaces of the carrier sheet and the face sheet disposed substantially in facing engagement;

B. applying adhesive on one of said mating surfaces, prior to the carrier sheet and face sheet being disposed substantially in facing engagement, in discrete zones individual to the discrete elements to be manufactured from the face sheet, each of said zones being recessed from the entire periphery thereof; and C. severing the face sheet, while the carrier sheet and face sheet are disposed substantially in facing engagement, individually about the periphery of each of the discrete elements whereby no contact is made with the adhesive and the discrete elements are carried by said carrier sheet arranged in substantial alignment thereon with adhesive interposed between each discrete element and the carrier sheet and recessed from the periphery thereof.

2. A method for manufacturing discrete elements, each of said discrete elements in a manufactured form having predetermined lateral edges and leading and trailing edges together forming a periphery for each discrete element, carried by a carrier sheet, the method comprising:

A. passing the carrier sheet and a face sheet from which said discrete elements are to be manufactured along first and second paths of travel which are initially spaced from each other and thereafter are entrained with each other with corresponding mating surfaces of the carrier sheet and the face sheet disposed in substantially facing engagement;

B. applying adhesive intermittently on one of said mating surfaces, prior to the carrier sheet and face sheet being disposed substantially in facing engagement, in discrete zones individual to the discrete elements to be manufactured from the face sheet, each of said zones being recessed from said lateral edges and from said leading and trailing edges of the discrete element to be manufactured so that each of said zones of adhesive is recessed from the entire periphery of the discrete element thereof to be manufactured; and C. severing the face sheet, while the carrier sheet and the face sheet are disposed substantially in facing engagement, along the lateral edges and leading and trailing edges of each discrete element to be manufactured and thus about the entire periphery of each discrete element and in spaced relation to the discrete zone of adhesive of each discrete element so as to prevent embedding of the adhesive in the carrier sheet as a result of severing and preventing migration of the adhesive over time beyond the periphery of each respective discrete element.

3. A method for manufacturing discrete elements, said discrete elements carried by a carrier sheet, each of said discrete elements in a manufactured form having a predetermined periphery, said discrete elements subsequently to be dispensed from the carrier sheet during movement of the carrier sheet in a predetermined direction of movement, the method comprising:

A. passing the carrier sheet and a face sheet from which said discrete elements are to be manufactured along paths of travel wherein said sheets are first spaced from each other and are thereafter traveled with each other with corresponding mating surfaces of the carrier sheet and the face sheet disposed substantially in facing engagement;

B. applying adhesive on one of said mating surface, prior to the carrier sheet and the face sheet being disposed substantially in facing engagement, in discrete zones individual to the discrete elements to be manufactured from the face sheet and recessed from the periphery of each of said discrete elements to be manufactured and said zones of the respective discrete elements to be manufactured being spaced from each other in said predetermined direction of movement; and C. severing the face sheet, while the carrier sheet and face sheet are disposed substantially in facing engagement, individually about the periphery of each of the discrete elements whereby the discrete elements are carried by said carrier sheet substantially without adhesive extending between adjacent discrete elements in said predetermined direction of movement of the carrier sheet.

4. A method for manufacturing discrete elements from two sheets having longitudinal dimensions wherein the discrete elements manufactured by the method are carried by one of said two sheets and are dispensed therefrom during movement along a dispensing path of travel substantially in alignment with said longitudinal dimensions, the method comprising:

A. applying adhesive on one of said two sheets in substantially intermittent successive zones of adhesive along the longitudinal dimension of the sheet wherein adjoining zones along said longitudinal dimension have portions spaced from each other along the longitudinal dimension of the sheet to form substantially adhesive free areas between said portions of adjoining zones of adhesive along said longitudinal dimension of the sheet;

B. placing the two sheets in engagement in substantial longitudinal alignment so that the zones of adhesive resist separation of the two sheets; and C. severing one of the two sheets along courses substantially corrolated with said zones of adhesive to form the discrete elements, carried by the other of the two sheets, having edges substantially adjacent to said substantially adhesive free areas whereby the portions of the sheet about the discrete elements can be removed from about said discrete elements and from said other of the two sheets without substantial adhesive resistance.

* * * * *

UNITED STATES PATENT AND TRADEMARK OFFICE

CERTIFICATE OF CORRECTION

PATENT NO. : 4,661,189

DATED : April 28, 1987

INVENTOR(S) : Peter A.Voy and Robert D. Ihle

It is certified that error appears in the above-identified patent and that said Letters Patent is hereby corrected as shown below:

Column 4, line 52, after "invention," delete "r".

Column 13, line 48, delete "movvement" and substitute ---movement ---.

Column 14, line 54, delete "surface" and substitute ---surfaces ---.

Signed and Sealed this

First Day of September, 1987

Attest:

DONALD J. QUIGG

*Attesting Officer* *Commissioner of Patents and Trademarks*